United States Patent [19]

Palm

[11] Patent Number: 5,587,898
[45] Date of Patent: Dec. 24, 1996

[54] METHOD AND APPARATUS FOR FUZZY CONTROL

[75] Inventor: Rainer Palm, Munich, Germany

[73] Assignee: Siemens Aktiengesellschaft, Munich, Germany

[21] Appl. No.: 397,857

[22] Filed: Mar. 2, 1995

[30] Foreign Application Priority Data

Mar. 17, 1994 [DE] Germany ............... 44 09 169.9

[51] Int. Cl.$^6$ .................................. G05B 13/02
[52] U.S. Cl. ...................... 364/148; 395/61; 395/900
[58] Field of Search .................. 364/148–179; 395/3, 61, 900, 903–910

[56] References Cited

U.S. PATENT DOCUMENTS 5,410,613  4/1995  Suzuki .

OTHER PUBLICATIONS

"Application of Fuzzy Algorithms For Control of Simple Dynamic Plant," Mamdani, Proc. IEEE, vol. 121, No. 12, Dec. 1974, pp. 1585–1588.
"An Introduction to Fuzzy Control," Drainkov et al., 1993, pp. 118–119 and 164–167.
"Sliding Mode Fuzzy Control," Palm, IEEE International Conference on Fuzzy Systems 1992, San Diego, pp. 519–526.
"An Introduction to Fuzzy Control," Driankov et al., 1993, pp. 115–128 and 149–155.
"Unfair Coins and Necessity Measures: Towards a Possbilistic Interpretation of Histograms," Dubios et al., Fuzzy Sets and Systems, vol. 10 (1983), pp. 15–20.
"A VLSI Fuzzy Logic Controller with Reconfigurable, Cascadable Architecture," Watanabe, IEEE J. of Solid–State Cir., vol. 25, No. 2 (Apr. 1990), pp. 376–382.
"Constructing Membership Functions Using Statistical Data," Civanlar et al., Fuzzy Sets and Systems, vol. 18 (1986), pp. 1–13.
"Fuzzy Control with Fuzzy Inputs: The Need for New Rule Semantics," Driankov et al., Proc. of 1994 IEEE 3rd int. Fuzzy Systems Conf., Orlando, Florida, Jun. 26–29, 1994, vol. 1, pp. 13–21.

*Primary Examiner*—Roy N. Envall, Jr.
*Assistant Examiner*—Steven R. Garland
*Attorney, Agent, or Firm*—Hill, Steadman & Simpson

[57] ABSTRACT

In a method and apparatus for fuzzy control in contrast to standard methods and arrangements, no sharp quantity is processed as an input quantity of the fuzzy controller; instead, an input quantity is supplied that is affected with a probability density distribution. Thus it is not a sharp value but the probability density distribution of an input value whose membership degree is determined in the inference procedure of the fuzzy controller. This procedure offers advantages, particularly given asymmetrical distribution densities. First, one thus obtains a better response behavior of the controller and, second, the disadvantages that would occur given a pre-filtering of the signal, such as information losses, are avoided.

12 Claims, 7 Drawing Sheets

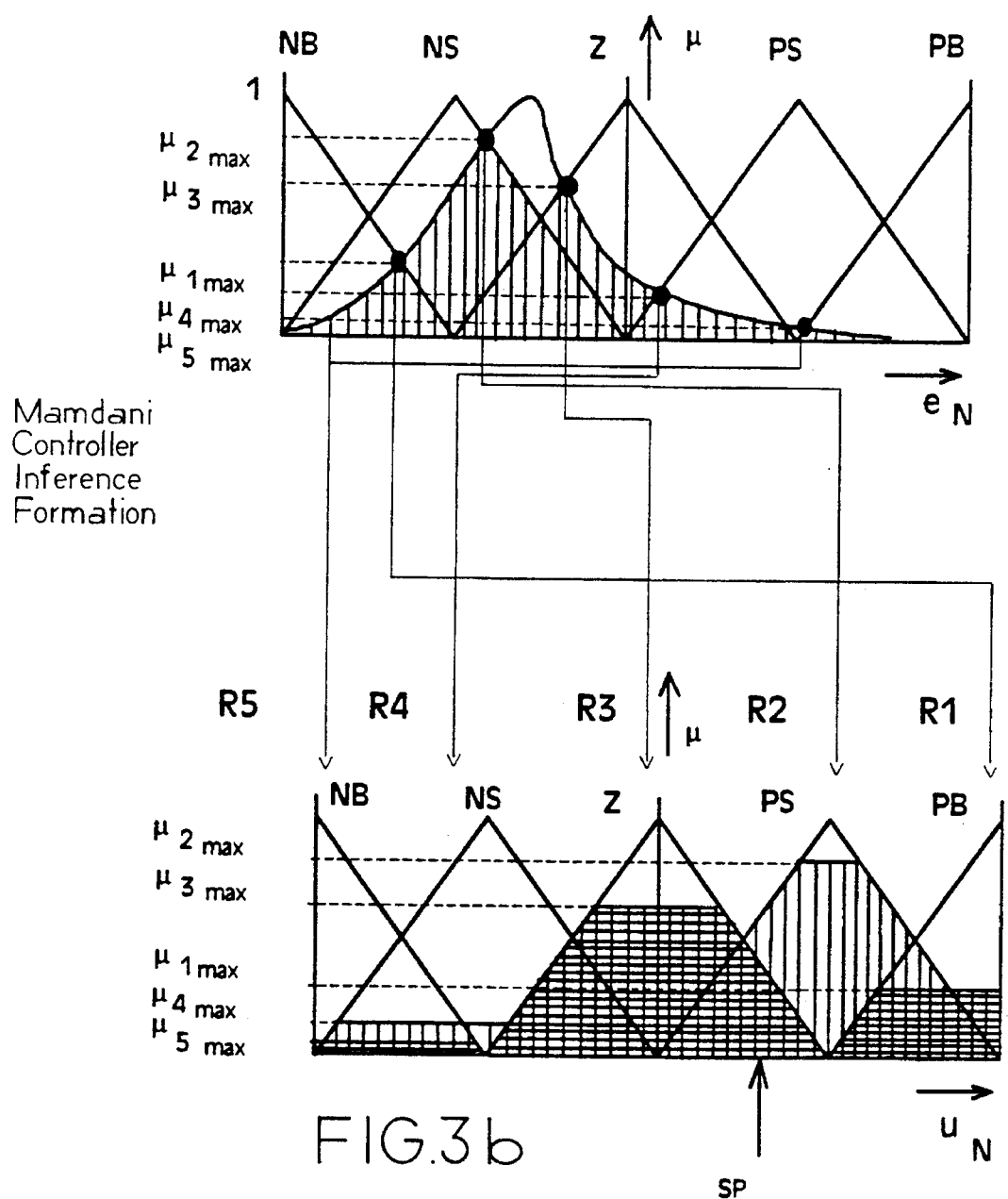

METHOD AND APPARATUS FOR FUZZY CONTROL

BACKGROUND OF THE INVENTION

1. Field of the Invention

The present invention is directed to a method and apparatus for fuzzy control which takes into account the presence of noise at the input of the fuzzy controller in the formulation of the manipulated variable.

2. Description of the Prior Art

Fuzzy controllers are increasingly gaining significance since complex control-oriented problems can often be more simply solved with fuzzy controllers than in a conventional way. In practice, however, it is often not a clear, but instead a noise-infested, quantity that occurs as the control difference, this having a negative influence on the control behavior of the fuzzy controller when it is supplied to the controller in unfiltered form.

In known, theoretical works and applications that refer to fuzzy control (FC), sharp input quantities for the controller are always assumed, such as in a Mamdani controller (see "Applications of Fuzzy Algorithms for Control of a Simple Dynamic Plant," Mamdani, Proc. IEEE Vol. 121, No. 12, December 1974). The input quantity is scaled within the fuzzy controller and is then fuzzified (Mamdani, supra; also "An Introduction to Fuzzy Logic," Driankov et al. 1993, pp. 164–167); "fuzzification" meaning that the corresponding membership degrees are assigned to a normalized, sharp input quantity corresponding to the prescribed input reference fuzzy sets. Thereafter, the IF-THEN rules of the fuzzy controller are processed in a known way on the basis of the output reference fuzzy sets, with an output fuzzy set arising as the result. A sharp output quantity is produced from this output fuzzy set by defuzzification (for example, according to the center of area method). This is denormalized and emitted as an output to the path to be controlled as a physical manipulated variable. If noise is superimposed on the useful signal, then either the accidental signal value is further-processed in the fuzzy controller or the signal is pre-filtered.

The disadvantage of processing an unfiltered signal is that, as a static, non-linear transmission element, the fuzzy controller generally transmits the noise directly to the manipulated variable. When the signal path has a low-pass character, then the path itself acts as a filter. The setting means and path, however, are too highly loaded as a result so that the signal must generally be pre-filtered. The disadvantage of pre-filtering, however, is that a sliding average is in fact produced by the pre-filtering but the information abut the scatter of the signal and further statistical moments are lost. This information, however, allows conclusions to be made about the confidence of the individual measured value as well as about a potential asymmetry of the probability distribution density of these values. The latter can supply information about asymmetries in the measurement system but can also indicate systematic errors such as drift.

SUMMARY OF THE INVENTION

An object of the present invention is to provide a method and an apparatus for control on the basis of a fuzzy controller, whereby noise appearing at the input of the fuzzy controller is processed together with the actual useful signal such that the statistics of the mix "useful signal/noise" are taken into consideration in the calculation of the manipulated variable.

The above object is achieved in a method for fuzzy control of a device including the steps of forming a control difference having at least one unsharp quantity with varying values with a probability density distribution of those values, supplying the control difference to a fuzzy controller, normalizing the probability density distribution in the fuzzy controller to a predetermined value so as to obtain a normalized probability density distribution, and conducting a fuzzy logic inference procedure in the fuzzy controller using the normalized probability density distribution to determine a membership degree of the probability density distribution to form a manipulated quantity. The device is then controlled dependent on the manipulated quantity.

One advantage of the method of the invention is that an average, sharp value that is not supplied to the fuzzy controller as the control difference, but instead a value is supplied which exhibits a probability density distribution. When an asymmetrical probability density distribution of this value occurs, this results in different weighting of the fuzzy rules in the inference procedure and the statistical information influences the manipulated quantity that is formulated by the fuzzy controller.

Advantageously, quantities that are affected with statistical noise can be processed with the method of the invention as the control difference with the probability density distribution of this quantity being identified over a fixed time interval.

Spatially scattered measured values can also be processed with the method of the invention in that one measured value is interpreted as the probability density distribution of the measured value over a spatial region and is supplied to the fuzzy controller as the control difference.

It is especially advantageous to calculate the probability density distribution during a time that corresponds to the time constant of the controller.

It is advantageous given employment of the method of the invention to divide a time interval into time sub-intervals and to acquire the measured values of the signal therein. The probability density distribution of the signal can then be calculated in a simple way by counting the frequency of occurrence of the occurring measured values.

Given employment of the method of the invention in a Mamdani control method, it is advantageous to form the probability density distribution as membership function with at least one reference input fuzzy set and to further-process the maximum membership value of all intersections in the conclusion part of the inference procedure. One thus obtains a manipulated quantity that optimally involves the statistical information.

Given employment of a fuzzy controller that works according to the Takagi-Sugeno method, it is advantageous to calculate the control weight for a fuzzy control in exactly the same way as in the Mamdani controller but, for calculating a sharp output quantity, to multiply this with the center of area value of the probability density distribution, or with the value of the control difference membership function.

It is especially beneficial to provide a classifier in an arrangement for fuzzy control, this classifier calculating a probability distribution density from a control difference signal by taking measured values at specific time intervals and counting the frequency of occurrence of these measured values.

It is especially beneficial to provide an inference unit in an arrangement of the invention, this inference unit working either according to the Mamdani principle or according to the Takagi-Sugeno principle, since these are the two fuzzy control procedures that are most frequently utilized.

DESCRIPTION OF THE DRAWINGS

FIGS. 3a and 3b show the inference procedure given a Mamdani controller.

DESCRIPTION OF THE PREFERRED EMBODIMENTS

Figure 1:
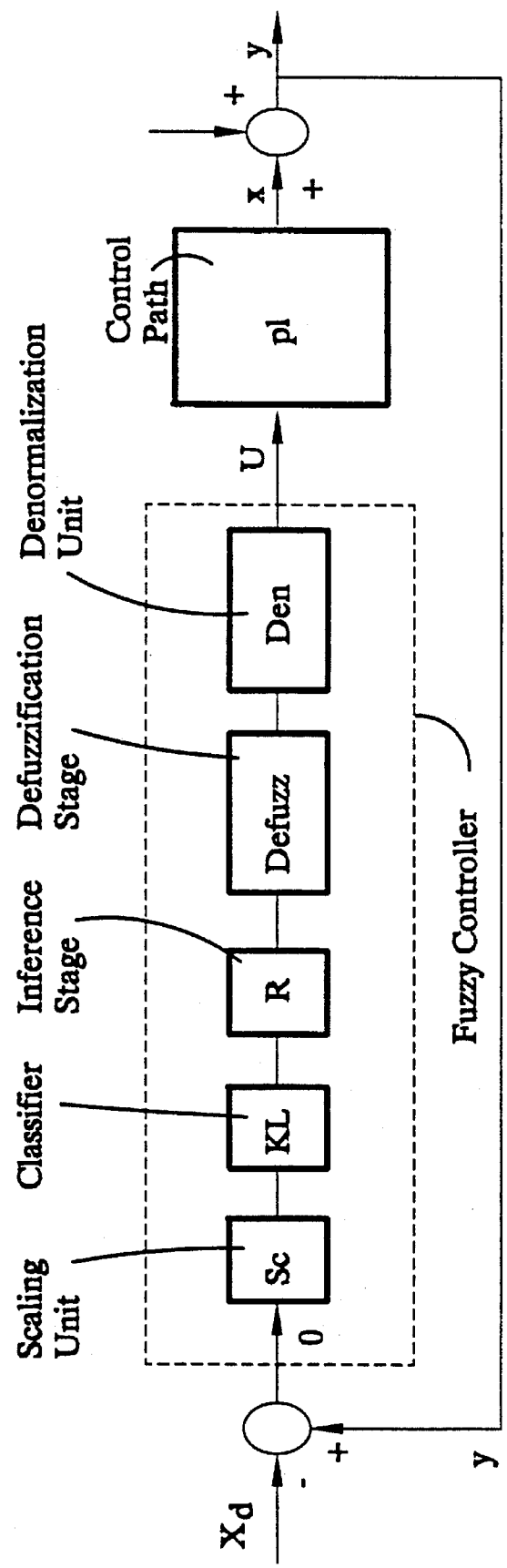
FIG. 1 schematically-shows a control path with a fuzzy controller of the invention.

FIG. 1 shows an example of a control circuit in which a Mamdani fuzzy controller FR is provided. A value $x_d$ is applied to the control circuit as a reference input, this being operated on by a feedback y to form a control difference e. This control difference is imaged onto an interval (universe of discourse) in a normalizing stage Sc, for example by multiplication with a scaling factor, and is subsequently supplied to a classifier KL. In the latter, a frequency distribution is formed during the course of a time interval T and the input membership function is then formed by normalization to, for example, the maximum frequency value. This input membership function is supplied to an inference stage R. This is followed by the defuzzification process in a defuzzification unit Defuzz and the denormalization of the resulting quantity in a denormalizing stage Den. The manipulated quantity u, which is supplied to a control path p1, arises as an output of the fuzzy controller FR. This control path p1 (which includes the controlled device) reshapes the manipulated quantity u to form the output quantity x that is charged with a disturbance d, represented by addition thereto, to form the feedback value y.

As already set forth in the discussion of the prior art, the inference unit of the fuzzy controller FR in this control circuit is not supplied with a sharp quantity e as a control difference. On the contrary, it receives an unsharp quantity, for example in the form of a probability density distribution of a time-dependent value of this quantity; or it is supplied with a spatially distributed quantity in the form of a probability density distribution of a value of this quantity with reference to a spatial region. It should thereby be noted that the unsharpness of the quantity can arise, for example, due to a noise-infested reference input $x_d$, or that the unsharp control difference may arise because the feedback is charged with an unsharp disturbance d. The new approach is thus pursued herein of not supplying a sharp value to a control circuit but, on the contrary, to enter a probability density distribution as the control difference e and to process this in the inference process of the fuzzy controller FR. For example, this normalized probability density distribution is interpreted in the inference stage R as control difference membership function.

It is not a sharp value of the control difference, but instead a membership function of the control difference, that is processed as the input quantity in a condition part as well as in a conclusion part of the inference stage R. By contrast to the standard methods, it is not only one intersection with a reference membership function that is obtained; rather, dependent on the curve of the reference membership function, a plurality of intersections are obtained with, for example, the intersection having the maximum membership is selected for further-processing. By contrast to previous methods that employ crisp inputs, on the other hand, it is possible that more than two reference membership functions can be simultaneously intersected for a cross point ratio 1 of the reference membership functions (cross point ratio=1, cross point level=0.5, see Driankov et al., supra, p. 119). Due, for example, to an asymmetrical curve of the control difference membership function, the advantage is achieved in the inventive method that more than two different input reference fuzzy sets can be differently weighted. The membership values found as intersections can be subsequently intersected with the output reference fuzzy sets in the conclusion part of the inference processor R dependent on the defined fuzzy rules. By applying, for example, the standard center of area method for defuzzification in the defuzzification stage Defuzz and subsequent denormalization in the denormalizing stage Den, for example, one subsequently obtains a sharp value as the output quantity u. Differing from fuzzy control methods previously known, however, this value is now dependent on the statistics of the input control difference. This leads, for example, to an improved response of the fuzzy controller to noise-infested signals and also offers the advantage that additional filtering of the input control difference can be completely foregone, whereby, of course, the disadvantages that arise due to filtering can also be avoided.

Figure 2A:
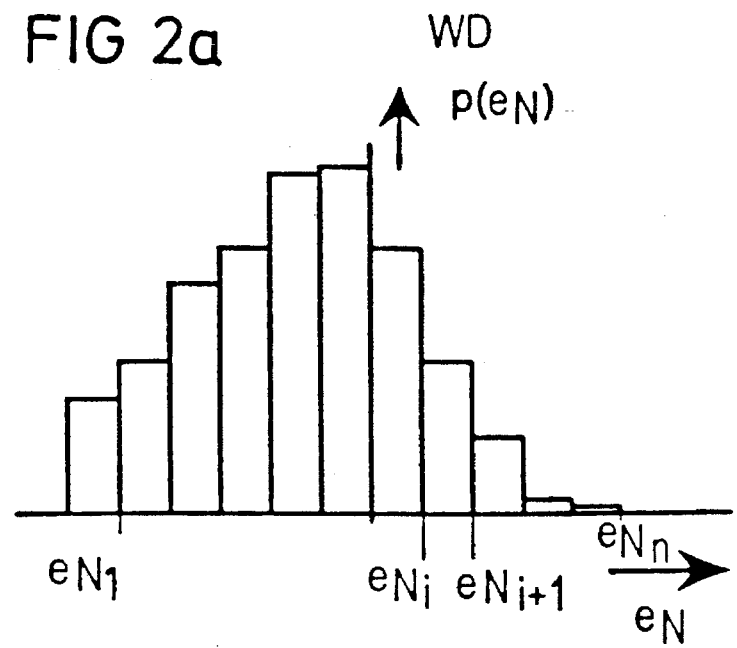
FIGS. 2a and 2b show the calculation of a probability density distribution.
Figure 2B:
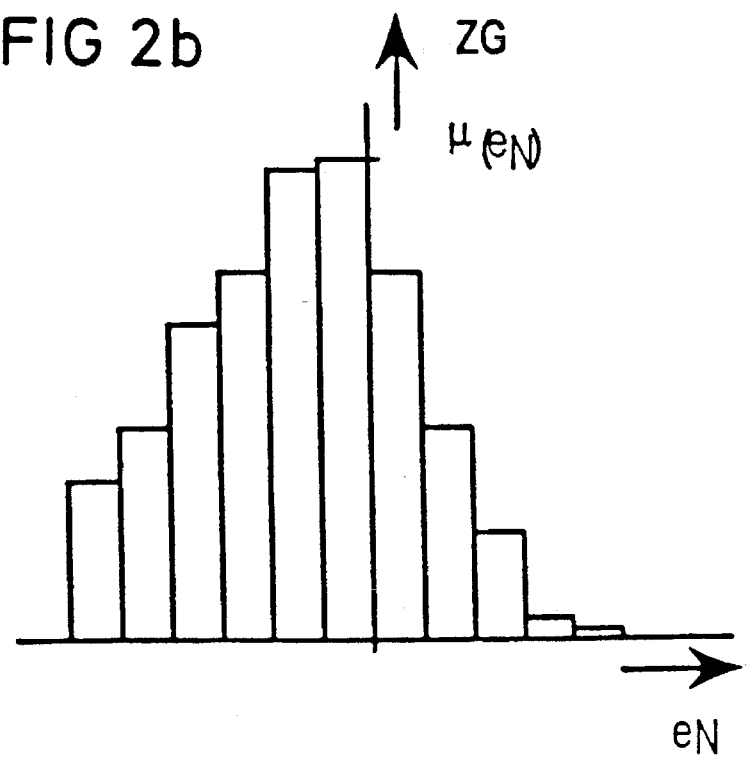

As an example, FIGS. 2a and 2b show how a probability density distribution can be acquired from a time-dependent signal. First, it must be assumed that an incoming signal, in this case the control difference $e_N$, is investigated during a defined time interval T, for example in a classifier of the fuzzy controller. This occurs by means of the signal $e_N$ being multiply measured during the time interval T. A numbering, for example, of the different measured values can subsequently ensue and a frequency value arises for each value $e_{N1}$ through $e_{Nn}$. This value can be taken as the probability density distribution $p(e_N)$. An example of such a probability distribution density is entered as WD in FIG. 2a.

FIG. 2b shows how an interpretable membership function of the control difference signal $e_N$ can be derived from probability density distribution WD. The individual values of $e_N$ are entered therein dependent on a membership value $\mu(e_N)$. The illustrated membership function ZG is entered in the form of a histogram. In order to convert the probability density distribution WD into a membership function ZG, for example, the maximum probability value $p(e_N)$ is utilized as normalizing quantity. The probability density distribution WD is thus normalized, for example, to 1 in order to obtain ZG.

In detail, one can thereby proceed as follows:

Within the scope of the invention, a probability density distribution p in the form of histogram can be registered within a predetermined time T with the assistance of k measurements. To this end, the physical signal (for example, the error signal e) is scaled using a predetermined scaling factor $N_e$ so that the normalized signal $e_N$ falls into a predetermined, normed domain $I_e=(e_1, e_n)$ divided into n−1 classes with a certain probability:

$$e_N = N_e \cdot e. \tag{1}$$

In a classifier, $e_N$ is subsequently assigned to a likewise predetermined interval $e_N \in [e_i, e_{i+1}]$ within the domain $I_e=(e_i,$ $e_n$). By using k measurements, a histogram having n−1 classes for the frequency distribution of $e_N$ is constructed in the domain $I_e=(e_1, e_n)$. A membership function $\mu(e_N)$ is formed from this histogram by normalizing all frequency values $p(e_N)$ to the maximum value $p(e_N)_{max}$, this membership function $\mu(e_N)$ having the following significance:

$$e_N \text{ is } e_N(p(e_N)_{max}). \tag{2}$$

The $e_N$ value thus receives the membership value $\mu(e_N)=1$ with $p(e_N)=p(e_N)_{max}$.

In the case of a fuzzy controller having only one input, one usually enters into the rule set with the resulting membership function $\mu(e_N)$. Let the rule set of FIG. 3a serve as an example.

In the case of a Mamdani inference concept, the average (the minimum) of the input fuzzy set is formed with the respective input reference fuzzy set $e_N$=NB, . . . ,PB, and the maximum membership values $\mu_{1max} \ldots \mu_{5max}$ are formed. The output reference fuzzy sets $u_N$=NB, . . . ,PB are clipped with these maximum values.

The defuzzification is achieved in a simple way by forming the center of area in the output fuzzy set.

The procedure of normalizing to 1 is appropriate since the fuzzy sets are usually normalized to 1 for evaluation in an inference procedure of a fuzzy controller.

The quantity serving as the normalization standard, however, is of no significance for the method of the invention. It is merely to be noted that the same normalization quantity is employed for the norming of the probability distribution density as is employed for the input reference fuzzy sets and for the output reference fuzzy sets, since a meaningful comparison of these quantities is otherwise not possible.

FIGS. 3a–3c show examples of different procedures in the implementation of the method of the invention in combination with a Mamdani inference process. In FIG. 3a, one can thereby see the underlying fuzzy rules. The procedure in the condition part of the inference process is shown in the upper portion of FIG. 3b and the evaluation of the arising membership values in the conclusion part is shown in the lower portion of FIG. 3b.

FIG. 3a is essentially self-explanatory. It must merely be noted that the rules R1–R5 are consecutively numbered and that the normalized quantities are employed here as reference quantities, i.e. $e_N$ as the normalized control difference and $u_N$ as normalized manipulated quantity. Further, NB denotes negative large, NS denotes negative small, Z denotes zero, PS denotes positive small and PB denotes positive large.

The upper part of FIG. 3b shows the intersection formation of the control difference membership function $e_N$ with the input reference fuzzy sets. The membership values $\mu_{1max}$ through $\mu_{5max}$ thereby arise due to the intersection formation with the control difference membership function. The procedure in the operation of the functions, i.e., intersection formation here, derives from the logical operation of the linguistic variable that is defined in the fuzzy rules R1–R5. In detail, one obtains $\mu_{2max}$ as the value of the intersection of $e_N$ and NS, $\mu_{3max}$ as the membership value of $e_N$ and Z, $\mu_{1max}$ as the membership value of $e_N$ to NB, $\mu_{4max}$ as the membership value $e_N$ to PS and $\mu_{5max}$ as the membership value of $e_N$ to PB. It can be clearly seen from this example that a membership function that is not equally distributed leads to different membership values $\mu$ in comparison to other methods. The method of the invention thus differs from standard methods wherein only a sharp value, which is also to be considered as a uniformly distributed membership function with a Gaussian distribution, is employed.

Here, for example, the maximum membership values $\mu_{max}$ are calculated in the condition part. This occurs dependent on the fuzzy rules R1–R5 and the logical operations that have been selected. Without limitation, however, it is also conceivable to employ membership values other than the maximum value of the function intersection as the membership value.

The procedure in the conclusion part of the Mamdani fuzzy controller is shown in the lower part of FIG. 3b as an example of the method of the invention. The upper and inner parts of FIG. 3b are connected to one another by arrows that are provided with the names of the individual fuzzy rules that are applied in the conclusion part at the corresponding location. The membership values for the output reference fuzzy set are found from the condition part of the fuzzy controller via the membership values. These are correspondingly entered in FIGS. 3a and 3b at the left edge. The sharp output value $u_N$ from the conclusion part is calculated in a standard way by forming the center of area found by conclusion.

For that case wherein the controller processes the variable $s=\lambda \cdot e + \dot{e}$ (sliding mode fuzzy controller as described in "Sliding Mode Fuzzy Control," Palm, $1^{st}$ FUZZ-IEEE '92, San Diego, pp 519–526), the following steps, for example, are made:

1. Identification of e by measuring y and subsequent reference value-to-actual value comparison
2. Normalization (scaling) of e: $e_N=N_e \cdot e$
3. Identification of $\dot{e}$ by measuring $\dot{y}$ and subsequent reference value-to-actual value comparison
4. Normalization (scaling of $\dot{e}$: $\dot{e}_N=N_{\dot{e}} \cdot \dot{e}$
5. Formation of $S_N=e_N+\dot{e}_N$
6. Classification of $s_N$ corresponding to n−1 predetermined classes within the domain $I_s=(s_i, s_n)$
7. Formation of fuzzy set $\mu_{sN}$ by norming the frequency distribution obtained in step 6
8. Processing according to the following rules:

IF $s_N$ = NB    THEN $u_N$ = PB

IF $s_N$ = NS    THEN $u_N$ = PS

IF $s_N$ = Z      THEN $u_N$ = Z

IF $s_N$ = PS    THEN $u_N$ = NS

IF $s_N$ = PB    THEN $u_N$ = NB with the result of an output fuzzy set for $u_N$ 9. Defuzzification of $u_N$ by center of gravity formation
10. Denormalization of $u_N$: $u=N_u \cdot u_N$
11. Emitting the manipulated variable u as an output onto the control path.

The transfer characteristic of a fuzzy controller with fuzzy inputs and crisp outputs cannot be identified in the same simple way as that with crisp inputs and crisp outputs. The reason for this is that there is no longer any point-to-point mapping between input and output, and the registrations of such a characteristic is only possible with the assistance of selected parameters of the input fuzzy step. Two parameters, the average value $\bar{e}_N$ and an abbreviation $\sigma_{eN}$, suffice for a bell-shaped input fuzzy set (normalized Gaussian curve).

Figure 7:
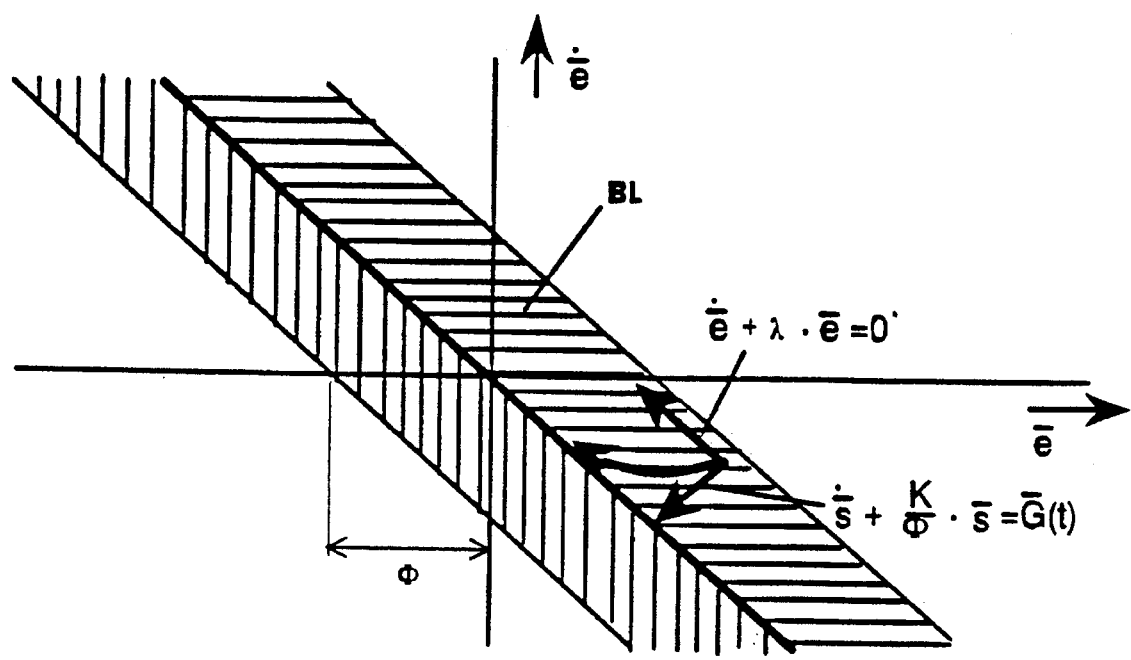
FIG. 7 shows the behavior of the average values of the fuzzy states in the phase plane for sliding mode control.

Since a sliding mode fuzzy controller acts like a state-dependent filter, as noted in Driankov et al., supra, the following results consequently occur for fuzzy inputs:

Signals with greater scatter (standard deviation $\sigma_{eN}$) are more strongly filtered than signals having lower scatter. Further, the approximation phase in the direction of the origin of the phase plane decelerates for signals having high scatter and accelerators for signals having low scatter; this can be easily seen on the basis of the corresponding filter equations. This can best be explained with reference to the example of the sliding load control with boundary layer BL, a non-linear control type, that comes closest to the fuzzy controller. FIG. 7 thereby shows the behavior of the average values $\dot{\bar{e}}$ and $\bar{e}$ of the fuzzy states e and $\dot{e}$ in the phase plane for the sliding mode control with boundary layer BL.

In this analysis

K=maximum controller output

λ=absolute value of the slope of the switching line $\bar{G}(t)$=average value of the model uncertainties, unmodeled frequencies, parameter fluctuations, and $$\bar{s}=\lambda \cdot \bar{e}+\dot{\bar{e}}. \qquad (3)$$

The approximation process of the state vector $\bar{e}\rightarrow=(\bar{e}, \dot{\bar{e}})^T$ in the direction of the origin of the phase plane is determined by the following filter equations:
Direction normal to switching straight line:

$$\dot{\bar{e}}+\lambda \cdot \bar{e}=0$$

Direction of switching line:

$$\dot{\bar{s}}+\frac{K}{\phi} \cdot \bar{s}=\bar{G}(t) \qquad (5)$$

Similar conditions are valid in the case of the aforementioned sliding mode fuzzy controller, since such a controller is a generalization of the sliding mode controller with boundary layer BL. Since a smaller $u_N$ is generated given higher scatter, however, a smaller K arises in the filter equation (5) that describes the approximation phase in the direction of the switching straight line. The average values $\bar{G}(t)$ of the model uncertainties, unmodeled frequencies, parameter fluctuations are therefore also more highly filtered (more weakly weighted) in this case.

Figure 4A:
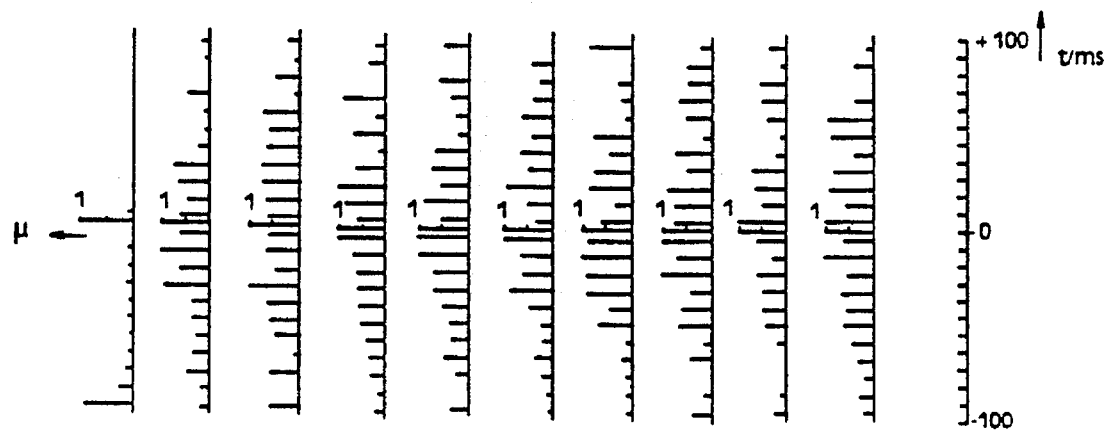
FIGS. 4a and 4b show the control behavior of a fuzzy controller that works according to the method of the invention.
Figure 4B:
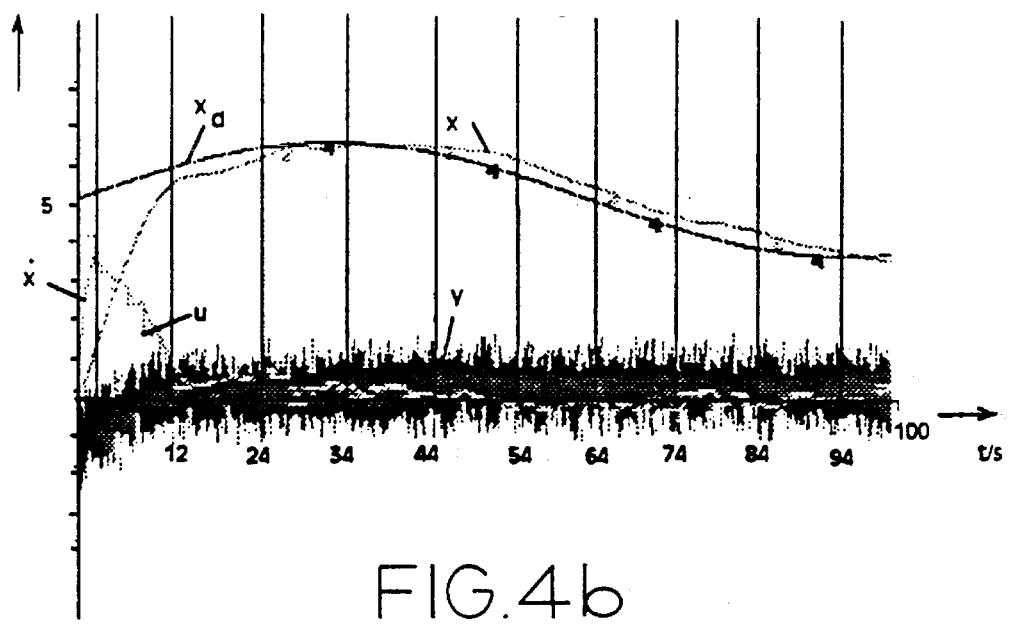

FIGS. 4a and 4b show an example of a control process that sequences according to the method of the invention. The same designations as in the other Figures are employed. It should be noted that the time division of FIG. 4b also applies to FIG. 4a. In detail, the probability density distribution or the corresponding membership function of the control difference is entered over a specific, constant time interval in FIG. 4a from left to right. Here, this time interval lies, for example, within +100 ms and -100 ms of the values that are entered at the lower axis as normalized times; however, it can also have other values. One can clearly see that the calculated membership functions do not obey a Gaussian distribution. This is particularly clear in the case of the value at time 64.

In FIG. 4b, the reference input $x_d$ is entered as a sine function over the time. At the same time, one can see the manipulated quantity x that was calculated according to the method of the invention. Further, a noise-infested quantity y is shown as feedback in the diagram. Since this noise-infested quantity, which constitutes a quantity affected with probability statistics, is utilized for forming the control difference, the probability density distribution or control difference membership functions shown in FIG. 4a arise. Particularly at the reversal point of the sine curve, which lies approximately at time 64, one can see that the introduction of the statistics supplies a better manipulated quantity x.

Figure 5:
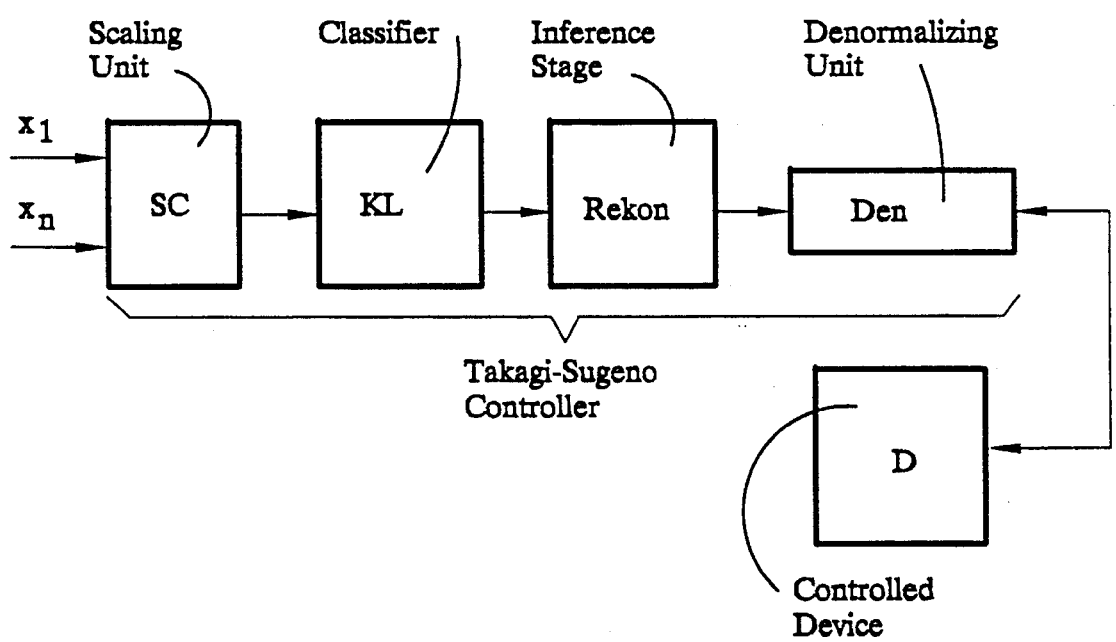
FIG. 5 shows a schematically illustrated Takagi-Sugeno controller.

FIG. 5 schematically shows the controller structure of a Takagi-Sugeno controller. In detail, this is composed here of a scaling unit Sc, a classifier KL, of an inference rule (rule base and conclusion unit) Rekon and a denormalizing unit Den. In the Takagi-Sugeno controller, n sharp values $x_1$ through $x_n$ are thereby supplied to the scaling unit Sc, these having been calculated at a specific point in time in the control circuit. A histogram is constructed in the classifier KL over a time interval T and the respective input membership function is constructed from this histogram by normalization to, for example, the maximum frequency value. The inference stage Rekon here is composed of a condition part and a conclusion part, whereby the condition part functions in exactly the same way as in a Mamdani controller; in the conclusion part, however, a function is imposed on the membership values that have been found, this function leading directly to a sharp value of the manipulated quantity $u_N$ without a defuzzification unit. This is converted to a sharp manipulated quantity u by denormalization in the denormalizing unit Den, which is used to control a device D.

Figure 6:
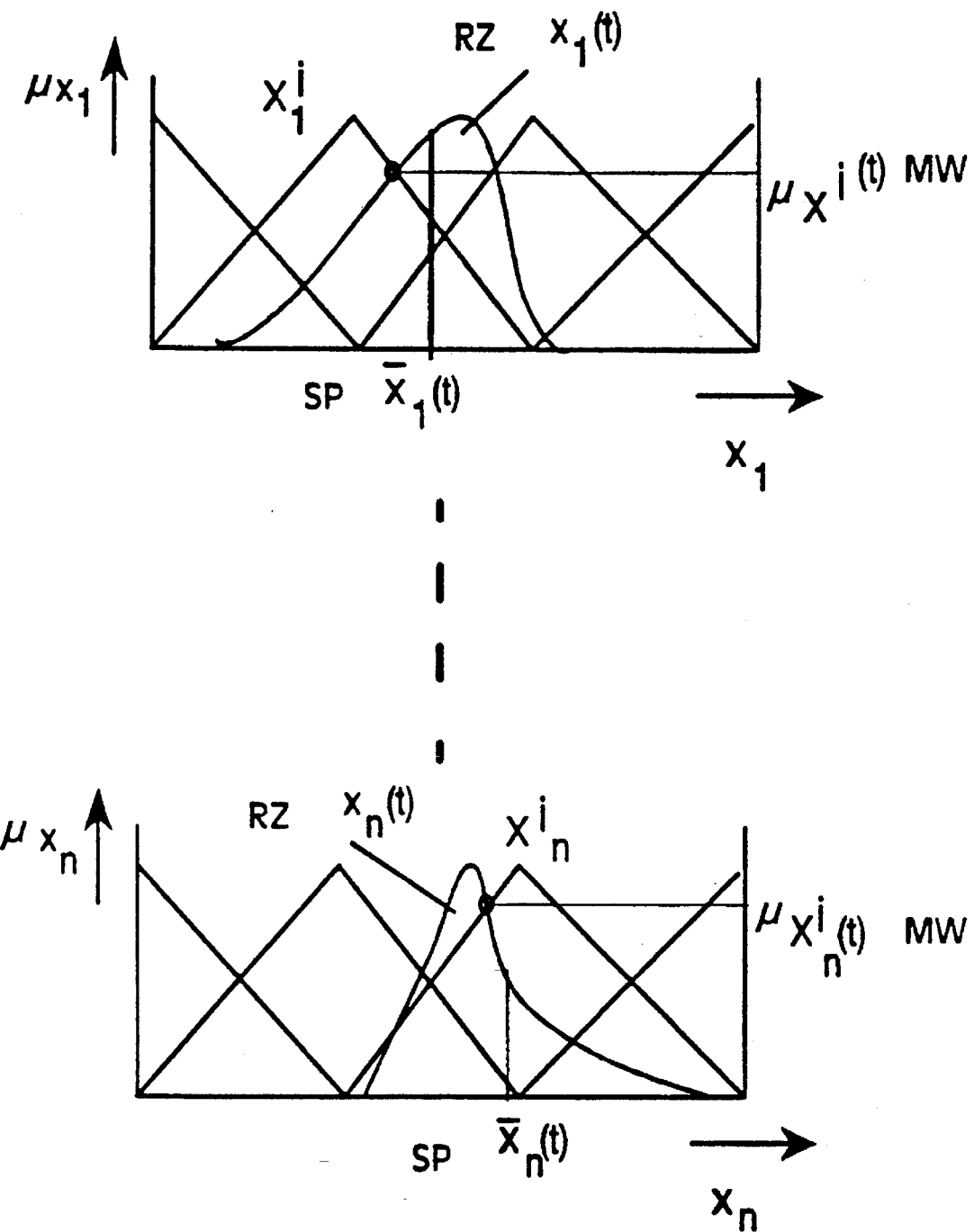
FIG. 6 shows the inference process in a Takagi-Sugeno controller.

FIG. 6 shows an example of the functioning of the condition part of a Takagi-Sugeno controller. For example, the control difference membership function RZ is to be operated here with a rule $R_i$ that contains n AND operations of linguistic variables $x_1$ through $x_n$. According to the method of the invention, for example, it is provided here to intersect the control difference membership function RZ is intersected with the input reference fuzzy sets of the linguistic variables and to separately calculate a membership value $\mu_{x1}^i{}_{(t)}$ through $\mu_{xn}^i{}_{(t)}$ is formulated based on the intersections from each linguistic value $x_1{}^i$ through $x_n{}^i$. The minimum MW of these calculated membership values for the rule $R_i$ serves as control weighting in the conclusion part of the Takagi-Sugeno controller. It has proven advantageous according to the method of the invention to calculate the center of area SP of the respective control difference membership function $x_1(t)$ of an input value as $\bar{x}_1(t)$ (i.e, $\bar{x}_n(t)$) as the center of area SP of $x_n(t)$ for calculating the equivalents of sharp input quantities $x_1$ through $x_n$ for the Takagi-Sugeno controller.

Takagi-Sugeno fuzzy controllers differ in terms of their control structure from the conventional fuzzy controller, as described in "Fuzzy Identification of Systems and Its Application To Modeling and Control," Takagi et al., IEEE Trans. on Syst. Man and Cyb., Vol SMC-15, No. 1, 1985, pp 116–131. Whereas fuzzy sets occur in the condition part as well as in the conclusion part of a rule in the Mamdani fuzzy controller, a fuzzy set in fact resides in the condition part of the rule in the Takagi-Sugeno fuzzy controller but an equation that produces an algebraic relationship between the input variables and the output variables resides in the conclusion part. For example, a rule of this type has the following form:

Rule $R_i$: IF $(x_1=X_1{}^i)$ AND ... AND $(x_n=X_n{}^i)$ THEN $u_i=f_i(x_i, \ldots, x_n)$ This rule is calculated such that the membership degrees $\mu_{x_1}{}^i, \ldots \mu_{x_n}{}^i$ for the fuzzy values $X_1{}^i, \ldots, X_n{}^i$ are calculated first for n crisp values $x_1 \ldots x_n$ that were measured at a specific point in time t. The control weighting is calculated from these membership degrees on the basis of minimum formation:

$$\mu^i=\min(\mu_{x_1}{}^i, \ldots \mu_{x_n}{}^i)$$

Subsequently, the equation:

$$u_i=f_i(x_i, \ldots, x_n)$$

is calculated and is multiplied by the control weighting $\mu^i=\min(\mu_{x_1}{}^i, \ldots, \mu_{x_n}{}^i)$.

From m rules, one thus obtains m values of $u_i$ that, after processing all rules, are combined as follows to form a common controller output value u:

$$u = \frac{\sum_{i=1}^{m} \mu^i \cdot u_i}{\sum_{i=1}^{m} \mu^i}$$

Since the controller output is already a crisp value, the controller structure of the Takagi-Sugeno controller does not contain a defuzzification block.

As regards the processing of the condition page of a rule, the functioning of the Takagi-Sugeno controller for fuzzy inputs is based on that of the Mamdani controller:

1. Formation of the average sets of the fuzzy input sets $X_1(t)=(\mu_{x_1}(x_1(t)), x_1(t)) \ldots X_n(t)=(\mu_{x_n}(x_n(t)), x_n(t))$ with the respective fuzzy sets $X^i_1, \ldots X^i_n$ that are processed in rule $R_i$.

2. Formation of the maximum $\mu^i_{kmax}$ (with k=1 ... n, number of the reference fuzzy set) of all membership values of the respective average set $X_1(t)=(\mu_{x_1}(x_1(t)), x_1(t)) \ldots X_n(t)=(\mu_{x_n}(x_n(t)), x_n(t))$ (see FIG. 12).

3. Formation of the minimum over all $\mu^i_{kmax}$:

$$\mu^i - \min (\mu^i_{1max}, \ldots, \mu^i_{nmax}).$$

This equation represents the control weighting for the $i^{th}$ rule $R_i$.

Differing from the functioning with crisp inputs, $X_k(t)$ represents a fuzzy set. The result of the conclusion equation, however, should be a crisp value. The crisp values $x_i, \ldots, x_n$ in the original conclusion equation $u_i=f_i(x_i, \ldots, x_n)$ of the $i^{th}$ rule are therefore preferably replaced by the centers of area $\bar{x}_i, \ldots, \bar{x}_n$ of the fuzzy values $X_i, \ldots, X_n$, it being expected of these that they represent the fuzzy input values adequately well. The conclusion equation then reads:

$$u_i = f_i(\bar{x}_1, \ldots \bar{x}_n)$$

and the equation for the overall value again is derived as:

$$u = \frac{\sum_{i=1}^{m} \mu^i \cdot u_i}{\sum_{i=1}^{m} \mu^i}$$

Although modifications and changes may be suggested by those skilled in the art, it is the intention of the inventors to embody within the patent warranted hereon all changes and modifications as reasonably and properly come within the scope of their contribution to the art.

I claim as our invention:

1. A method for fuzzy control of a device, comprising the steps of:

forming a control difference comprising at least one unsharp quantity having varying values with a probability density distribution of said values;

supplying said control difference to a fuzzy controller;

in said fuzzy controller, normalizing said probability density distribution to a predetermined value to obtain a normalized probability density distribution;

conducting a fuzzy logic inference procedure in said fuzzy controller using said normalized probability density distribution to determine a membership degree of said probability density distribution to form a manipulated quantity; and controlling said device dependent on said manipulated quantity.

2. A method as claimed in claim 1 comprising the additional step of formulating said probability density distribution of said at least one unsharp quantity over a fixed time interval.

3. A method as claimed in claim 2 comprising the additional steps of:

formulating a control error after controlling said device with said manipulated quantity; and subtracting said control error from said unsharp quantity in formulating said control difference.

4. A method as claimed in claim 2 comprising the steps of:

defining a control event; and formulating said probability density distribution during said control event.

5. A method as claimed in claim 2 comprising the additional step of formulating said probability density distribution during a control event by repeated analysis of said control difference, each analysis resulting in an analyzed value, and numbering said analyzed values.

6. A method as claimed in claim 1 wherein the step of formulating said control difference is further defined by formulating said control difference as a probability density distribution of only one value comprising a spatial distribution of values occurring within a fixed spatial region of a spatially occurring quantity of said fuzzy controller.

7. A method as claimed in claim 1 wherein the step of conducting said inference procedure includes formulating a membership function on the basis of which said membership degrees are determined, and comprising the additional steps of:

identifying an intersection of said membership function with at least one input set to said inference procedure according to the Mamdani method and defining a membership value of said intersection as an intersection value;

employing said intersection value in a conclusion portion of said inference procedure for forming said manipulated quantity.

8. A method as claimed in claim I wherein the step of conducting said inference procedure includes formulating a membership function on the basis of which said membership degree is determined, and comprising the additional steps of:

identifying an intersection of said membership function with at least two input sets to said inference procedure in a condition part of said inference procedure according to the Takagi-Sugeno method, and identifying an intersection value set of the membership values of the intersections;

identifying a center of area value of said membership function as a sharp input value for a conclusion part of said inference procedure according to the Takagi-Sugeno method; and forming a product of each input value and a minimum value of said intersection value for forming said manipulated quantity.

9. An apparatus for fuzzy control of a device, comprising:

means for forming a control difference comprising at least one unsharp quantity having varying values with a probability density distribution of said values;

means for supplying said control difference to a fuzzy controller;

said fuzzy controller comprising means for normalizing said probability density distribution to a predetermined value to obtain a normalized probability density distribution;

means for conducting a fuzzy logic inference procedure in said fuzzy controller using said normalized probability density distribution to determine a membership degree of said probability density distribution to form a manipulated quantity; and said fuzzy controller comprising means for controlling a device dependent on said manipulated quantity.

10. An apparatus as claimed in claim 9 wherein said means for conducting said inference procedure comprises means for conducting a Mamdani inference procedure.

11. An apparatus as claimed in claim 9 wherein said means for conducting an inference procedure comprises means for conducting a Takagi-Sugeno inference procedure.

12. An apparatus as claimed in claim 9 wherein said fuzzy controller comprises a sliding mode fuzzy controller with a boundary layer.

* * * * *